United States Patent [19]

Bowser

[11] Patent Number: 4,622,249
[45] Date of Patent: Nov. 11, 1986

[54] MULTIPLE PANE UNIT HAVING A FLEXIBLE SPACING AND SEALING ASSEMBLY

[75] Inventor: George H. Bowser, New Kensington, Pa.

[73] Assignee: PPG Industries, Inc., Pittsburgh, Pa.

[21] Appl. No.: 723,111

[22] Filed: Apr. 15, 1985

[51] Int. Cl.[4] .............................................. E06B 3/66
[52] U.S. Cl. ..................................... 428/34; 52/172; 52/304; 52/788; 156/109
[58] Field of Search ................... 428/34; 52/172, 304, 52/479, 788; 156/109

[56] References Cited

U.S. PATENT DOCUMENTS

| | | | |
|---|---|---|---|
| 3,654,005 | 4/1972 | Higgins et al. | 156/108 |
| 3,669,785 | 3/1972 | Bowser et al. | 156/109 |
| 3,733,237 | 8/1973 | Wolff | 156/468 |
| 3,791,910 | 2/1974 | Bowser | 161/45 |
| 3,832,254 | 8/1974 | Bowser et al. | 156/107 |
| 3,919,023 | 11/1975 | Bowser et al. | 156/107 |
| 4,032,489 | 6/1977 | Haverstreng | 260/27 |
| 4,109,431 | 8/1978 | Mazzoni et al. | 52/172 |
| 4,153,594 | 5/1979 | Wilson, Jr. | 260/31.8 |
| 4,193,236 | 3/1980 | Mazzoni et al. | 52/172 |
| 4,198,254 | 4/1980 | Laroche et al. | 156/107 |
| 4,205,104 | 5/1980 | Chenel | 428/34 |
| 4,215,164 | 7/1980 | Bowser | 428/34 |
| 4,226,063 | 10/1980 | Chenel | 52/172 |
| 4,429,509 | 2/1984 | Vachet et al. | 52/788 |
| 4,431,691 | 2/1984 | Greenlee | 428/34 |

*Primary Examiner*—John E. Kittle
*Attorney, Agent, or Firm*—Robert A. Westerlund, Jr.

[57] ABSTRACT

A multiple pane unit comprising a pair of sheets maintained in parallel, spaced-apart relationship to each other by a spacing and sealing assembly defining a substantially hermetically sealed, insulating airspace between the sheets. The spacing and sealing assembly includes inner and outer elements. The outer element is adhered to the marginal periphery of the inner, facing surfaces of the sheets. The inner element is self-adhered to the marginal periphery of the inner, facing surfaces of the sheets in communication with the airspace and in juxtaposition to the outer element. Both the inner and outer elements have at least minimum adhesive structural bonding strength. The inner element preferably comprises a moisture vapor transmittable matrix material having a desiccant material dispersed therein, thereby ensuring communication between the desiccant and the airspace sufficient to maintain dryness of the airspace. The outer element is preferably composed of a substantially moisture-impervious material, to thereby prevent saturation of the desiccant and ensure the weathertight integrity or hermetic sealing of the unit.

20 Claims, 2 Drawing Figures

MULTIPLE PANE UNIT HAVING A FLEXIBLE SPACING AND SEALING ASSEMBLY

BACKGROUND OF THE INVENTION

1. Field of the Invention

The present invention relates generally to multiple pane window units, and more particularly, to multiple pane window units having a non-metal, flexible, spacing and sealing assembly.

2. Discussion of the Technological Environment

Multiple pane window units generally comprise a pair of glass sheets maintained in spaced-apart relationship to each other by a spacing and sealing assembly extending around the marginal periphery of the inner, facing surfaces of the sheets, to define a substantially hermetically sealed, insulating air space between the sheets. The spacing and sealing assembly generally comprises an inner spacer-dehydrator element extending around the marginal periphery of the inside facing surfaces of the glass sheets and an outer sealing element extending around the outside periphery of the inner spacer-dehydrator element.

In one typical form of multiple pane window construction, the inner spacer-dehydrator element comprises a hollow metal spacer element generally adhered by a mastic composition to the marginal periphery of the inside, facing surfaces of the sheets, to provide a primary hermetic seal. The metal spacer element is generally tubular in shape and filled with a desiccant material, which is put in communication with the insulating air space to absorb moisture therefrom to enhance the performance and durability of the unit. The outer sealing element generally comprises a resilient, moisture-resistant strip placed around the marginal periphery of the glass sheets and the outer periphery of the inner spacer-dehydrator element to provide a secondary hermetic seal. A drawback of multiple pane window units having a metal spacer element is the cost of fabricating the metal spacer element.

U.S. Pat. No. 3,791,910, issued to the present Inventor, G. H. Bowser, and assigned to the assignee of the instant invention, teaches a multiple glazed unit having resilient inner and outer spacing and sealing assembly elements. The inner spacer-dehydrator element comprises a desiccant material dispersed throughout a moisture vapor transmittable matrix material, such as a material selected from the family of thermoplastic elastomers comprising block copolymers of styrene and butadiene. The matrix material is adhered to the marginal periphery of the inner, facing surfaces of the glass sheets by means of a continuous bead or ribbon of an adhesive moisture-resistant, mastic composition which forms an adhesive structural bond to maintain the sheets about the spacer at a predetermined spacing. The outer sealing element includes a continuous bead or ribbon of an adhesive, moisture-resistant material. A drawback with this type of multiple glazed unit is that the spacer-dehydrator element is not self-adhering to the sheets, thereby increasing the complexity of the fabrication/manufacture of the unit.

U.S. Pat. Nos. 4,226,063 and 4,205,104 issued to Chenel teach a multiple pane window unit having a spacing and sealing assembly comprised of an inner filament made of a first plastic material such as desiccant containing polyisobutylene and an outer mastic layer consisting of a second organic material such as a silicone or polysulfide elastomer. The outer mastic layer forms an adhesive structural bond with the glass sheets and provides for the mechanical stability of the window, while simultaneously ensuring water tightness of the unit. A disadvantage of the Chenel window units is that the inner filament does not contribute to the mechanical stability of the unit. A disadvantage of the Chenel unit is that the inner filamentary seal is has very low moisture vapor permeability which limits migration of moisture from the airspace into the polyisobutylene material of the inner filamentary seal. This property is undesirable because moisture is prevented from being removed readily from the insulating airspace to prevent hazing or fogging of the unit, and eventually, buildup of moisture on the inner glass sheet surfaces, which may cause staining and scumming thereof, will occur. It would be preferable to have desiccant material dispersed in a moisture vapor transmittable matrix to improve communication of the desiccant with the airspace, to thereby increase the rate of moisture vapor removal from the airspace. The Chenel patents further teach an inner filamentary seal comprised of two or more juxtaposed layers, the concentration of desiccant material dispersed through each layer increasing progressively from the outside to the inside of the unit, to purportedly improve the rate of moisture removal from the airspace. This design unduly complexifies the fabrication of the unit.

U.S. Pat. No. 4,198,254 issued to Laroche teaches a hollow panel prepared by uniting vitreous sheets by means of a spacer made of synthetic polymeric material. The synthetic polymeric material preferably comprises a hardenable viscoelastic ribbon having a tensile strength of at least 4 kg./cm$^2$, an elongation at break in excess of 50%, and a water permeability of less than 0.2 g. of water per m.$^2$ of surface per 24 hours per mm. of material thickness per cm. of Hg pressure. Due to the impermeability of the spacer material, it is necessary, in order to obtain an appropriate rate of moisture removal from the panel airspace, to employ a separate desiccant-containing strip in communication with the airspace. A limitation of this teaching is that the mechanical stability of the unit depends entirely upon the outer spacer element.

It would therefore be desirable to have a multiple pane unit which eliminates the disadvantages and limitations of the prior art units.

SUMMARY OF THE INVENTION

The present invention relates to a multiple pane unit comprising a pair of sheets maintained in spaced-apart relationship to each other by a spacing and sealing assembly defining a substantially hermetically sealed, insulating air space between the sheets. The spacing and sealing assembly includes an outer element adhered to the marginal periphery of the inner, facing surface of the sheets, wherein the outer element is characterized by the property of being substantially moisture-impervious, an inner element self-adhered to the marginal periphery of the inner, facing surfaces of the sheets and disposed in vapor communication with the insulating air space, wherein the inner element is characterized by the properties of being substantially water vapor permeable and having sufficient adhesive bonding strength to maintain the sheets in spaced-apart relationship to each other without allowing the sheets to move away from each other, resulting in substantial variance of the thickness of the air space; and a dehydrator element for absorbing moisture present in the insulating air space.

The inner element should have a water vapor permeability or transmission rate of at least about 10 gm./24 hr./1 sq. meter/mil at 100° F., 90 percent R.H., as determined by the ASTM E-96-66 Method E test, and preferably has a water vapor permeability of at least about 40 gm./24 hr./1 sq. meter/mil at 100° F., 90 percent R.H., as determined by the ASTM E-96-66 Method E test. The inner element is preferably comprised of a flexible, organic material, such as a room temperature vulcanizable adhesive sealant material.

The outer element should have a water vapor permeability of no greater than about 8 gm./24 hr./1 sq. meter/mil at 100° F., 90 percent R.H., as determined by the ASTM E-96-66 Method E test, and preferably has a water vapor permeability of no greater than about 2.5 gm./24 hr./1 sq. meter/mil at 100° F., 90 percent R.H., as determined by the ASTM E-96-66 Method E test. The outer element is preferably comprised of a flexible, organic material, such as a room temperature vulcanizable adhesive sealant material.

Further, the inner element should have an adhesive structural bonding strength characterized by a shear strength of at least about 10 p.s.i.; a tensile strength of at least about 20 pounds per square inch, or p.s.i.; and, an elongation at break of at least about 20%. The inner element preferably has an adhesive structural bonding strength characterized by a shear strength of at least about 40 p.s.i.; a tensile strength of at least about 40 p.s.i.; and, an elongation at break of at least about 100%.

Further, the outer element should have an adhesive bonding strength characterized by a shear strength of at least about 10 p.s.i.; a tensile strength of at least about 20 p.s.i.; and, an elongation at break of at least about 20%. The outer element preferably has an adhesive structural bonding strength characterized by a shear strength of at least about 40 p.s.i.; a tensile strength of at least about 40 p.s.i.; and, an elongation at break of at least about 100%. However, the adhesive structural bonding strength of the outer element is not limiting to the invention.

The dehydrator element preferably comprises desiccant material dispersed in said inner element. Due to the preferred moisture vapor permeability of the inner element, the desiccant material is in adequate communication with the insulating air space to enable adequate removal or adsorption of the airspace to ensure dryness of the airspace, and high performance and durability of the multiple pane unit. Further, due to the preferred adhesive structural bonding strength characteristics of the inner and outer elements, any loads (e.g. wind loads, static loads, thermal loads, mechanical stresses, etc.) which may be imposed upon the spacing and sealing assembly will be more evenly distributed relative to the prior art units, thereby minimizing the probability that disuniformities in the thickness of the air space will develop during the life of the unit, thereby extending the useful life of the unit and enhancing performance thereof.

DESCRIPTION OF THE INVENTION

Figure 1:
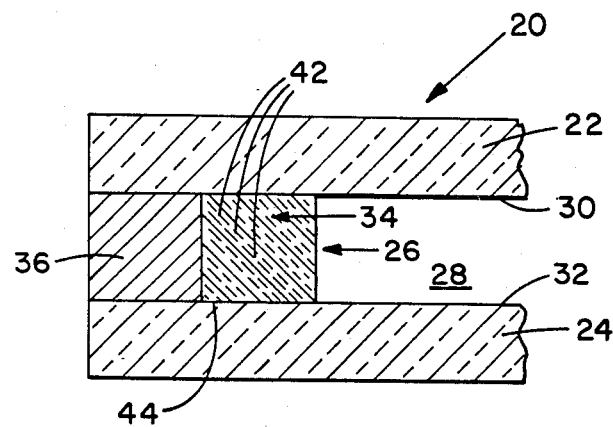
FIG. 1 is a fragmentary, transverse cross-sectional view of a preferred embodiment of the multiple pane unit of this invention.

Referring now to FIG. 1, there can be seen a multiple pane unit 20 comprising a pair of sheets 22, 24 held or maintained in preferably parallel, spaced-apart relationship to each other by a spacing and sealing assembly 26 defining a substantially hermetically sealed, insulating air space 28 between the sheets 22, 24. The sheets 22, 24 may be constructed or made of any convenient material, e.g. wood, metal, plastic, or glass. The sheets 22, 24 may be transparent, translucent, or opaque. The sheets 22, 24 will be illustratively described herein as glass sheets, e.g. float glass sheets. The glass sheets 22, 24 may be of any convenient shape, contour, profile, or configuration, e.g. straight, flat, bent, arcuate, curved, S-shaped, etc. Moreover, the glass sheets 22, 24 may be laminated, colored, tinted, coated, heat or chemical strengthened, or have any other convenient strength, aesthetic, optical and/or solar control properties. A particularly durable, energy efficient, aesthetically appealing, high performance coating which can be usefully or advantageously practiced with the window unit 20 of this invention is a heat and light reflective coating, i.e., solar control coating, applied to multi-glazed windows sold by PPG Industries, Inc. under their registered trademark SUNGATE®, e.g. SUNGATE 100®. The solar control coating may be applied to either or both of the inner, facing surfaces 30, 32 of the sheets 22, 24, respectively. The number, type, or other characteristics of the sheets employed in the practice of this invention, is not limiting to the invention.

In accordance with a preferred embodiment of the present invention, the spacing and sealing assembly 26 comprises an inner element 34 and an outer element 36 extending around the entire marginal periphery of the inner, facing surfaces 30, 32 of the sheets 22, 24, respectively, in juxtaposition to each other. The inner element 34 and the outer element 36 are preferably comprised of extrudable materials, e.g. resilient or flexible organic materials. The inner element 34 and the outer element 36 may be applied to the sheets 22, 24 in any convenient manner. For example, any of the methods or processes taught in U.S. Pat. Nos. 3,822,172; 3,876,489; 4,145,237; 4,088,522; 4,085,238; 4,186,685; 4,014,733; 4,234,372; or 4,295,914, which are herein incorporated by reference, or any other convenient method or process may be employed to apply the outer and inner elements and assemble the window unit. As an illustration, the inner element 34 material may be fed through an extrusion nozzle (not shown), and relative motion imparted to the extrusion nozzle and one of the glass sheets 22 or 24 to apply or lay or deposit or inject the extruded material (i.e. extrudate) in ribbon or strip or filament or cord or other convenient form, onto the marginal periphery of the sheet 22 or 24. The sheet 22 or 24 having the extrudate applied thereto is then aligned with a superimposed second sheet 24 or 22. The two sheets 22 and 24 are then pressed together and held in spaced relation by the extruded ribbon of inner element 34 material. Thereafter, the outer element material is then extruded to seal the air space 28.

In accordance with this invention, the inner element 34 is comprised of a material which provides an adhesive structural bond sufficient to hold the sheets 22, 24 in substantially fixed, parallel relation to each other without allowing substantial variance in the thickness T of the insulating air space 28. Further, the inner element 34 material is preferably flexible or resilient enough to accommodate thermal movement or the like of the glass sheets 22 and 24. More particularly, the inner element 34 should have an adhesive structural bonding strength characterized by a shear strength of at least about 10 p.s.i.; a tensile strength of at least about 20 p.s.i.; and, an elongation at break of at least about 20%. The inner element 34 preferably has an adhesive structural bonding strength characterized by a shear strength of at least about 40 p.s.i.; a tensile strength of at least about 40 p.s.i.; and, an elongation at break of at least about 100%. Preferably, the inner element 34 has these minimum adhesive structural strength properties, to withstand mechanical stresses, windloads, static loads, thermal loads, etc. that the unit 20 may be subjected to during storage, handling, transportation, and/or use, which may cause disuniformities in the thickness T of the air space 28, which may in turn cause undue localized stresses to develop in the spacing and sealing assembly 26, which may ultimately produce defects in the spacing and sealing assembly 26, which may eventually cause failure of the unit 20.

The outer element 36 is also preferably comprised of a material which provides an adhesive structural bond sufficient to hold the sheets 22, 24 in substantially fixed, spaced relation to each other without allowing substantial variance in the thickness T of the insulating air space 28. Further, the outer element 36 material is preferably resilient or flexural enough to accommodate thermal movement or the like of the glass sheets 22 and 24. More particularly, the outer element 36 should have an adhesive structural bonding strength characterized by a shear strength of at least about 10 p.s.i.; a tensile strength of at least about 20 p.s.i.; and, an elongation at break of at least about 20%. The outer element 36 preferably has an adhesive structural bonding strength characterized by a shear strength of at least about 40 p.s.i.; a tensile strength of at least about 40 p.s.i.; and, an elongation at break of at least about 100%. The outer element 36 preferably has these minimum adhesive structural strength properties to withstand mechanical stresses, windloads, static loads, thermal loads, etc. that the unit 20 may be subjected to during storage, handling, transportation, and/or use, may cause disuniformities in the thickness T of the air space 28, which may in turn cause undue localized stresses to develop in the spacing and sealing assembly 26, which may ultimately produce defects in the spacing and sealing assembly 26, which may eventually cause failure of the unit 20. However, the adhesive structural bonding strength of the outer element 36 is not limiting to the invention.

The fact that both the inner and outer elements 34, 36, respectively, have the above-delineated minimum adhesive structural bonding strength properties ensures or at least maximizes the probability that the thickness T of the insulating air space 28 will be maintained uniformly around the entire perimeter of the unit 20 during the life of the unit 20, thereby enhancing the optical performance/quality and the durability of the unit 20, and further minimizing diminution of the air space thickness T over the life of the unit 20. Further, the provision of structural properties for both the inner and outer elements 34, 36, respectively, increases/improves the distribution of any loads (e.g. windloads, static load, mechanical stresses, etc.) which may be transmitted to the spacing and sealing assembly 26, thereby improving the performance and maximizing the useful life of the unit 20.

Figure 2:
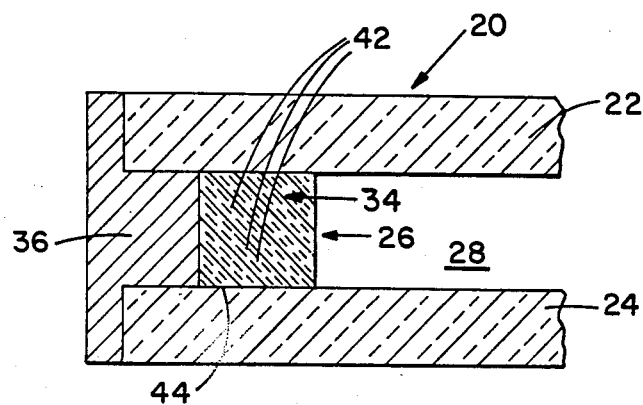
FIG. 2 is a fragmentary, transverse cross-sectional view of an alternative embodiment of the multiple pane unit of this invention.

In accordance with another aspect of the present invention, the inner element 34 material further includes a dehydrator or desiccant material dispersed therein. The function of the desiccant material is to absorb moisture present within the airspace 28, e.g. moisture trapped within the airspace 28 during assembly and fabrication of the unit 20, condensation occurring in the airspace 28 due to temperature and/or humidity differences between the inside of the airspace 28 and the outside of the unit 20, and any moisture which may intrude or infiltrate through the spacing and sealing assembly 26 and into the airspace 28. Otherwise stated, the desiccant material serves to keep the airspace 28 substantially dry or moisture-free, to thereby prevent hazing or fogging of the unit and permanent moisture-staining of the inner, facing surfaces 30, 32 of the glass sheets 22, 24. The desiccant material should be capable of adsorbing or picking up from the atmosphere in excess of 5 to 10 percent of its weight, preferably in excess of 10 percent of its weight, in moisture (water). However, the type of desiccant material employed is not limiting to the invention. In order to function effectively, the desiccant material should have at least a minimum level of communication with the airspace 28, so that moisture present within the airspace 28 will be effectively adsorbed by the desiccant material. In order to provide at least this minimum level of communication between the desiccant material and the airspace 28, the inner element 34 preferably includes desiccant material, represented by the dots 42 in FIGS. 1 and 2, dispersed throughout a moisture vapor transmittable matrix material 44. In accordance with the present invention, the moisture vapor transmittable matrix material is capable of transmitting moisture vapor and is also capable of functioning as a matrix material for the particular desiccant employed, in addition to possessing at least the minimum adhesive structural bonding strength characteristics or properties described hereinabove. In order that adsorption by a desiccant dispersed therein can proceed at a reasonable rate (i.e. rate of moisture vapor removal from the airspace 28), the moisture vapor transmittable material 44 selected should desirably have a substantial water vapor permeability or transmission rate, which for purposes of this invention is defined as above/at least about 10 gm./24 hr./1 sq. meter/mil at 100° F., 90 percent R.H., as determined by the Standards Methods of Test for Water Vapor Transmission of Materials in Sheet Form, ASTM Designation E-96-66 Method E. Preferably, however, the water vapor transmission of the matrix material used should be above/at least about 40 gm./24 hr./1 sq. meter/mil at 100° F., 90 percent R.H. Particularly good results are achieved when the water vapor transmission rate of the matrix material 44 employed is above about 50 gm./24 hr./1 sq. meter/mil at 100° F., 90 percent R.H.

It is preferred that the desiccant material 42 be substantially uniformly dispersed throughout the moisture vapor transmittable matrix material 44. However, the desiccant material 42 may be dispersed nonuniformly in the matrix material 44, such as taught in U.S. Pat. No. 4,226,063 issued to Chenel, which teachings are herein incorporated by reference.

The desiccant material 42 employed in the practice of the invention may include synthetically produced crystalline metal aluminasilicates or crystalline zeolites. A specific example of a synthetically produced crystalline zeolite that is particularly satisfactory and which is covered by U.S. Pat. Nos. 2,882,243 and 2,882,244 is Linde Molecular Sieve 13X ®, in powdered form, produced by Union Carbide Corporation, or Molecular Sieve 4-A ®, also produced by Union Carbide Corporation. However, other desiccant or adsorbent materials, preferably in pulverulent form or disintegratable into pulverulent form when dispersed in the matrix material 44, may also be used, such as anhydrous calcium sulfate, activated alumina, silica gel and the like. The type of desiccant material 42 employed in the practice of this invention, is not limiting to the invention.

A moisture vapor transmittable matrix material 44 which has been found particularly suitable for use in the practice of the present invention is a silicone glazing adhesive/sealant sold by Dow Corning Corp. under their registered trademark SILICONE 982 ®. The SILICONE 982 ® material is a flexible, organic, room temperature vulcanizable adhesive sealant material comprised of two components. One of the components comprises a base material and the other component comprises a curing agent or accelerator. Neither of the components is individually curable or vulcanizable. However, when the two components are combined, a chemical crosslinking reaction takes place which begins curing or vulcanizing the two-component material at room temperature. Although the material may take at least 1–2 weeks to achieve a full cure, the material substantially immediately forms a firm, resilient, adhesive bond to glass sufficient to maintain a pair of sheets in fixed, spaced-apart relation to each other. This structural adhesive bond enables assembly, fabrication, storage, transportation, and installation of window units incorporating this material, just after application of the material to the glass. Moreover, acceleration of the cure or vulcanization cycle may be achieved by subjecting the material to ultraviolet light exposure and/or heat.

Three test sample double pane window units were made for the purpose of testing the adhesive structural bonding strength of the SILICONE 982 ® material. Each of the test sample units comprised two sheets of clear float glass. Each of the sheets measured approximately 3 inches (7.62 cm.) long×1 inch (2.54 cm.) wide×$\frac{1}{4}$ inch (0.635 cm.) thick. The sheets of each test sample unit were held apart by a ribbon or filament of SILICONE 982 ® material interposed around the inner marginal periphery of the sheets. In each of the three test sample units, the filament of SILICONE 982 ® material measured approximately 2 inches (5.08 cm.) long×$\frac{1}{2}$ inch (1.27 cm.) wide×$\frac{1}{2}$ inch (1.27 cm.) thick (i.e. about 1 square inch of SILICONE 982 ® material). The three test sample units will hereinafter be referred to as units A, B, and C. In unit A, no desiccant was added to the SILICONE 982 ® material. In unit B, about 50% by weight of a desiccant material sold by Union Carbide Corp. under their trademark Molecular Sieve 4-A ® was added to the SILICONE 982 ® material. In unit C, about 40% by weight of Molecular Sieve 4-A ® was added to the SILICONE 982 ® material. In the case of units B and C, the Molecular Sieve 4-A ® was separately added to the base and curing agent components of the SILICONE 982 ® material. The base component and the Molecular Sieve 4-A ® was mixed for about 4 minutes in a Baker-Perkins mixer and the curing agent component and the Molecular Sieve 4-A ® were separately mixed for about 4 minutes in a Baker-Perkins mixer. Thereafter, the mixed base component-Molecular Sieve 4-A ® compound and the mixed curing agent component-Molecular Sieve 4-A ® compound were mixed together for about 7 minutes in a Baker-Perkins mixer. The material was then extruded by means of a Killian 100 extruder and then applied in strip form or extruded directly onto the marginal periphery of the glass sheets which were thereafter pressed or assembled together to provide completed test sample units. In the case of unit A, the base and curing agent components of the SILICONE 982 ® material were alone mixed together in a Baker-Perkins mixer for about 7 minutes prior to extrusion and assembly of the sheets.

The test sample units A, B, and C were then pulled, over a 1 week testing period, on an INSTRON tensile testing apparatus at a crosshead speed of about 0.05 inch per minute. (hereinafter throughout the specification and the claims referred to as "The Adhesive Bond Strength Test.") The SILICONE 982 ® material without desiccant of unit A was determined to have a tensile strength of about 117 p.s.i.; a shear strength of about 76 p.s.i.; and 100% elongation at break or rupture. The SILICONE 982 ® material with about 50% desiccant of unit B was determined to have a tensile strength of about 36 p.s.i.; a shear strength of about 20 p.s.i.; and 10% ultimate elongation. The SILICONE 982 ® material with about 40% desiccant of unit C was determined to have a tensile strength of about 66 p.s.i.; a shear strength of about 40 p.s.i.; and 10% ultimate elongation.

In general, the adhesive structural bonding strength of the SILICONE 982 ® material is inversely related to the amount of desiccant material combined therewith. Therefore, 10%–60% desiccant, by weight, (of the overall composition) is preferably added to the SILICONE 982 ® sealant material to ensure adequate adsorption of moisture from the airspace 28, while simultaneously at least meeting the hereinbefore-delineated minimum adhesive structural bonding strength criteria for the inner element 34 material. However, the amount of desiccant employed in the practice of this invention, is not limiting to the invention. The SILICONE 982 ® material has a moisture vapor permeability or transmission rate of about 110 gr.–550 gr./24 hr./1 sq. meter/mil at 100° F., 90 percent R.H., as determined by the ASTM E-96-66 Method E test, thereby providing adequate communication of the desiccant material 42 with the airspace 28.

It has been found that the chemical crosslinking reaction which occurs during the vulcanization of the SILICONE 982 ® material gives off or releases by-product chemical vapors into the airspace 28. These chemical vapors, one of which has been identified as methanol, may cause fogging or haziness of the unit 20, or otherwise impair performance of the unit 20. Therefore, it is recommended that amorphous silica, activated carbon, or any other suitable filler material be added to the SILICONE 982 ® material to prevent or minimize the release of chemical vapors, such as methanol, into the airspace 28. An amorphous silica sold by Illinois Mineral Co. under their registered trademark IMSIL A-25 ® may, for example, be used.

Another suitable moisture vapor transmittable matrix material 44 which may be employed in the practice of the present invention is a liquid silicone material sold by Dow Corning Corp. under their registered trademark SILASTIC 595 ® and described in U.S. Pat. Nos. 3,445,420 and 4,162,243, which teachings are herein incorporated by reference. The SILASTIC 595 ® material is comprised of two components, a base component and a curing agent or accelerator component, which are not individually curable or vulcanizable. However, when the base and the curing agent components are combined together, the resultant SILASTIC 595 ® rubbery-like material immediately begins curing or vulcanizing due to a chemical crosslinking reaction which takes place between the two components. Although the material may take at least 1-2 weeks to achieve a full cure, the SILASTIC 595 ® material acquires a tensile strength of about 1100 p.s.i. and an elongation at break of about 450%, according to information published by Dow Corning Corp. Further, it is preferred that an adhesion-promoting or coupling agent be added to the SILASTIC 595 ® to enhance its adhesive bonding to glass or the like. It is recommended that between about 0.2% to about 5% by weight (relative to the total weight of the two components of the SILASTIC 595 ® material), of the coupling agent, be added to the SILASTIC 595 ® material in order to provide, substantially immediately after application to glass, a firm, resilient, adhesive bond to glass sufficient to maintain a pair of glass sheets in fixed, spaced relation to each other during assembly, fabrication, storage, transportation, and installation of window units incorporating this material. Suitable coupling agents are the organo alkoxysilanes such as gamma-glycidoxy-trimethoxysilane, gamma-amino-propyl-trimethoxysilane, N-bis (beta-hydroxyethyl) gamma-amino-propyl-triethoxysilane and N-beta (aminoethyl)-gamma-amino-propyl-trimethoxysilane. A particularly suitable coupling agent is a gamma meth-acryloxypropyltrimethoxysilane sold by Dow Corning Corp. under their registered trademark Z-6030 ®.

Preferably 10%-60% of a suitable desiccant material is dispersed throughout the SILASTIC 595 ® material, which has a water vapor permeability or transmission rate of between about 110 gr.-550 gr./24 hr./1 sq. meter/mil at 100° F., 90 percent R.H., as determined by the E-96-66 Method E ASTM test, to ensure adequate dehydration of the airspace 28. Other suitable SILASTIC ® materials sold by Dow Corning Corp. which may also be suitable include liquid silicone rubber materials sold under their trademarks SILASTIC 591 ®, SILASTIC 596 ®, SILASTIC 598 ®, and SILASTIC 599 ®. The SILASTIC 591 ® material is additionally covered by U.S. Pat. No. 4,108,825, which teachings are herein incorporated by reference.

Another suitable moisture vapor transmittable matrix material 44 which may be used in the practice of this invention is an adhesive sealant material sold by General Electric Corp. under their registered trademark GE 1GS 3204 ® and covered by their U.S. Pat. No. 3,888,815, which teachings are herein incorporated by reference. Other types of moisture vapor transmittable materials may also be conveniently used in the practice of this invention, e.g. polysulfide or polyurethane-based materials, although various reinforcement fillers, such as zirconium orthosilicate; coupling agents, such as organoalkoxysilanes; and/or tackifiers, such as hydroxy-terminated polybutadiene resins, may need to be added thereto in order to meet the minimum adhesive structural bonding strength criteria established hereinbefore for the inner element 34 material.

In further accordance with the present invention, the outer element 36 material in addition to having the hereinbefore-established adhesive structural bonding strength properties, preferably is substantially moisture-vapor impervious in order to minimize migration or transgression of moisture vapor from the outside of the unit into the airspace 28. Otherwise stated, the outer element 34 material should be sufficiently moisture vapor impervious to prevent saturation of the desiccant material 42, to thereby ensure weathertightness (i.e. hermetic sealing) of the unit 20. By the term moisture vapor impervious is meant that the sealant material has a moisture vapor transmission rate of less than about 8 and preferably less than 5 grams/24 hours/square meter/mil at 100° F., 90 percent relative humidity, as determined by the ASTM E-96-66 Method E test, although this preferred range is not limiting to the invention. U.S. Pat. No. 3,791,910, issued to the present applicant, George H. Bowser, which teachings are herein incorporated by reference, teaches a room temperature vulcanizable mastic sealant material having the preferred adhesive structural bonding strength and moisture vapor imperviousness properties, and suitable for use as the outer element 36 material. More particularly, the mastic sealant material taught in U.S. Pat. No. 3,791,910 has a moisture vapor transmission rate of about 2.5 gr./24 hours/square meter/mil at 100° F., 90 percent R.H.; tensile strength of between about 42 p.s.i. to about 99.2 p.s.i.; and, an elongation at break of between about 185% to about 930%.

A suitable thermoplastic material which fulfills the preferred criteria of the outer element 36 material of this invention is a hot melt adhesive sealant material sold by Fuller Corp. under their registered trademark Fuller Hot Melt 1081-A ®. Further, other materials that may fulfill the criteria for the outer element 36 material include materials based upon, e.g., chlorobutyl; ethylene-propylene copolymers, cholosulfonated polyethylene; epichlorohydron; ethylene-propylene dieneterpolymer; butyl rubber; or, polyisobutylene.

Yet further, a polyethylene tape (not shown), a generally U-shaped channel member (not shown) or any other convenient means may be applied to the outer periphery of the spacing and sealing assembly 26 of this invention to protect the same from environmental attack or the like, although this is not limiting to the invention. Also, a decorative strip (not shown) or the like may be applied to the inner periphery of the spacing and sealing assembly 26 to impart or provide a desired "sight line" and/or color or other aesthetic property to the unit 20, although this is not limiting to the invention. Further, a separate dehydrator element or desiccant-containing strip (not shown) may be applied to the inner or outer periphery of the inner element 34 in addition to or in lieu of the desiccant material 42 in order to ensure sufficient dryness of the airspace 28, although this is not limiting to the invention. Further, many other modifications or variations to the present invention may appear to those skilled in the pertinent art which fall within the spirit and scope of the inventive concepts herein taught, which should be interpreted solely on the basis of the following claims.

What is claimed is:

1. A multiple pane unit comprising a pair of glass sheets maintained in spaced-apart relationship to each other by a spacing and sealing assembly defining a substantially hermetically sealed, insulating air space between the sheets, wherein the spacing and sealing assembly comprises:

an outer element self-adhered to the marginal edge periphery of the inner, facing surfaces of the sheets, wherein said outer element is characterized by a water vapor permeability or transmission rate of no greater than about 8 gm./24 hours/1 sq. meter/mil at 100° F., 90 percent R.H., as determined by the ASTM E-96-66 Method E test;

an inner element self-adhered to the marginal edge periphery of the inner, facing surface of the sheets inboard of said outer element, wherein said inner element is characterized by a water vapor permeability or transmission rate of at least about 10 gm./24 hours/1 sq. meter/mil at 100° F., 90 percent R.H., as determined by the ASTM E-96-66 Method E test, and wherein further, the adhesive bond between the interfacing surfaces of the sheets and said inner element is characterized by a shear strength of at least about 10 p.s i.; a tensile strength of at least about 20 p.s.i.; and, an elongation at break of at least about 10% as determined by The Adhesive Bond Strength Test.

dehydrating means for absorbing moisture present in the insulation air space.

2. The unit as set forth in claim 1, wherein said dehydrating means comprises desiccant material dispersed in said inner element.

3. The unit as set forth in claim 2, wherein said desiccant material comprises between about 10% to about 60%, by weight, of the total weight of said inner element and said disiccant material.

4. The unit as set forth in claim 3, wherein said inner element comprises a monolithic ribbbon of a flexible, adhesive sealant material.

5. The unit as set forth in claim 4, wherein said inner element further comprises a filler material compound into said adhesive sealant material to reinforce said sealant material.

6. The unit as set forth in claim 5, wherein said filler material comprises between about 0.1% to about 30% of the total weight of said inner element and said desiccant material.

7. The unit as set forth in claim 6, wherein said inner element further comprises a coupling agent compounded into said adhesive sealant material.

8. The unit as set forth in claim 6, wherein said filler material is selected from the group comprised of amorphous silica, activated carbon, and zirconium orhtosilicate.

9. The unit as set forth in claim 7, wherein said coupling agent comprises between about 0.2% to about 5%, by weight, of the total weight of said inner element and said desiccant material.

10. The unit as set forth in claim 9, wherein said coupling agent is selected from the family of organo-alkoxysilanes.

11. The unit as set forth in claim 9, wherein the adhesive bond between the interfacing surfaces of the sheets and said outer element is characterized by a shear strength of at least about 10 p.s.i.; a tensile strength of at least about 20 p.s.i.; and an elongation at break of at least about 20%, as determined by The Adhesive Bond Strength Test.

12. The unit as set forth in claim 9, wherein said adhesive bond between the interfacing surfaces of the sheets and said inner element is characterized by a shear strength of at least about 40 p.s.i.; a tensile strength of at least about 40 p.s.i.; and, an elongation at break of at least about 20%, as determined by The Adhesive Bond Strength Test.

13. The unit as set forth in claim 12, wherein said inner element is characterized by a water vapor permeability or transmission rate of at least about 40 gm./24 hours/1 sq. meter/mil at 100° F., 90 percent R.H., as determined by the ASTM E-96-66 Method E test.

14. The unit as set forth in claim 13, wherein said outer element is characterized by a water vapor permeability or transmission rate of no greater than about 2.5 gm./24 hours/sq meter/mil at 100° F., 90 percent R.H., as determined by the ASTM E-96-66 Method E test.

15. The unit as set forth in claim 14, wherein the adhesive bond between the interfacing surfaces of the sheets and said outer element is characterized by a shear strength of at least about 40 p.s.i.; a tensile stength of at least about 40 p.s.i.; and, an elongation at break of at least about 20% as determined by The Ahesive Bond Strength Test.

16. The unit as set forth in claim 9, wherein said outer element comprises a monolithic ribbon of a flexible, adheisve sealant material.

17. The unit as set forth in claim 16, wherein said inner element adhesive sealant material is selected from the group comprised of silicone, polysulfide, and polyurethane based adhesive sealant materials.

18. The unit as set forth in claim 17, wherein said outer element adhesive sealant material is selected from the group comprised of a material based upon a material selected from the group comprised of chlorobutyl; ethylene-propylene copolymers; chlorosulfonated polyethylene; epichlorohydron; ethylene-propylene diene terpolymer; butyl rubber; and, polyisobutylene.

19. The unit as set forth in claim 4, wherein said inner element adhesive sealant material is characterized by the property of being room temperature vulcanizable.

20. The unit as set forth in claim 16, wherein said inner element further comprises a tackifier for enhacing the self-adherence of said inner element to the sheets.

* * * * *

UNITED STATES PATENT AND TRADEMARK OFFICE
CERTIFICATE OF CORRECTION

PATENT NO. : 4,622,249

DATED : November 11, 1986

INVENTOR(S) : George H. Bowser

It is certified that error appears in the above-identified patent and that said Letters Patent is hereby corrected as shown below:

Claim 1 (column 11, line 16), "insulation" should be "insulating".

Claim 3 (column 11, line 23), "disiccant" should be "desiccant".

Claim 8 (column 11, line 40), "orhtosili-" should be "orthosili-".

Claim 15 (column 12, line 26), "stength" should be "strength".

Claim 16 (column 12, line 30), "adheisve" should be "adhesive".

Signed and Sealed this

Tenth Day of May, 1988

Attest:

DONALD J. QUIGG

*Attesting Officer*    *Commissioner of Patents and Trademarks*